United States Patent
Booth et al.

(10) Patent No.: US 8,129,877 B2
(45) Date of Patent: Mar. 6, 2012

(54) ARRANGEMENT FOR COOLING OF AN ELECTRICAL MACHINE

(75) Inventors: James Kenneth Booth, Brande (DK); Uffe Eriksen, Horsens (DK)

(73) Assignee: Siemens Aktiengesellschaft, Munich (DE)

( * ) Notice: Subject to any disclaimer, the term of this patent is extended or adjusted under 35 U.S.C. 154(b) by 168 days.

(21) Appl. No.: 12/606,244

(22) Filed: Oct. 27, 2009

(65) Prior Publication Data
US 2010/0102657 A1     Apr. 29, 2010

(30) Foreign Application Priority Data

Oct. 28, 2008   (EP) .................................... 08018798

(51) Int. Cl.
H02K 1/32    (2006.01)
H02K 3/24    (2006.01)
H02K 5/18    (2006.01)

(52) U.S. Cl. ................. 310/64; 310/58; 310/59; 310/62
(58) Field of Classification Search .................... 310/64, 310/58, 59, 62
See application file for complete search history.

(56) References Cited

U.S. PATENT DOCUMENTS

| | | | | |
|---|---|---|---|---|
| 2,722,616 | A * | 11/1955 | Moses ............................ | 310/54 |
| 2,780,739 | A * | 2/1957 | Baudry et al. ................. | 310/55 |
| 2,915,655 | A * | 12/1959 | Baudry ........................... | 310/55 |
| 2,917,644 | A * | 12/1959 | Laffoon et al. ................ | 310/64 |
| 2,920,218 | A * | 1/1960 | Beckwith ....................... | 310/55 |
| 3,119,032 | A * | 1/1964 | Mullner ......................... | 310/57 |
| 3,240,967 | A * | 3/1966 | Krastchew .................... | 310/54 |
| 3,435,263 | A * | 3/1969 | Willyoung ..................... | 310/61 |
| 3,441,758 | A * | 4/1969 | Albright et al. ................ | 310/58 |
| 3,571,635 | A | 3/1971 | Turner | |
| 3,652,881 | A | 3/1972 | Albright et al. | |
| 4,139,057 | A * | 2/1979 | Klaar ....................... | 165/104.13 |
| 4,208,599 | A * | 6/1980 | Armor et al. ................... | 310/64 |
| 4,264,834 | A * | 4/1981 | Armor et al. ................... | 310/59 |
| 4,348,604 | A * | 9/1982 | Thode ............................. | 310/62 |
| 4,845,394 | A * | 7/1989 | Kleinhans ..................... | 310/64 |
| 4,876,470 | A * | 10/1989 | Geller ............................. | 310/59 |
| 4,971,143 | A * | 11/1990 | Hogan ........................... | 165/122 |
| 4,991,394 | A * | 2/1991 | Wright ......................... | 60/226.1 |
| 5,559,380 | A * | 9/1996 | Nakamura et al. ............. | 310/64 |
| 5,763,969 | A * | 6/1998 | Metheny et al. ................ | 310/62 |
| 5,785,114 | A | 7/1998 | Armstrong et al. | |
| 6,201,323 | B1 * | 3/2001 | Semba et al. ................... | 310/52 |
| 6,246,134 | B1 * | 6/2001 | Berrong et al. ................ | 310/52 |

(Continued)

FOREIGN PATENT DOCUMENTS

EP          1583203 A2    10/2005

Primary Examiner — Quyen Leung
Assistant Examiner — Alex W Mok

(57) ABSTRACT

In one aspect, an arrangement for cooling of an electrical machine is provided. A rotor and a stator include an air-gap arranged between the rotor and the stator. The rotor and the stator include a circulation arrangement to allow the circulation of air for cooling-purposes of the rotor and of the stator. The rotor and the stator are encapsulated by a shell which is formed to allow the flow of hot air from the rotor and the stator to a heat-exchanger. The shell is formed to allow the flow of cool air from the heat-exchanger back to the rotor and the stator for cooling-purposes. The shell includes a number of corners, while each corner is used to gather the hot air before it is guided to the heat-exchanger.

27 Claims, 2 Drawing Sheets

U.S. PATENT DOCUMENTS

| | | | |
|---|---|---|---|
| 6,262,501 B1 * | 7/2001 | Semba et al. | 310/52 |
| 6,700,237 B1 * | 3/2004 | Yang | 310/58 |
| 2003/0193249 A1 * | 10/2003 | Drubel et al. | 310/58 |
| 2004/0084976 A1 * | 5/2004 | Thiot | 310/58 |
| 2004/0222711 A1 * | 11/2004 | Klimt | 310/59 |
| 2005/0067905 A1 * | 3/2005 | Maney et al. | 310/58 |
| 2006/0284511 A1 * | 12/2006 | Evon et al. | 310/216 |
| 2008/0238224 A1 | 10/2008 | Ressel | |

\* cited by examiner

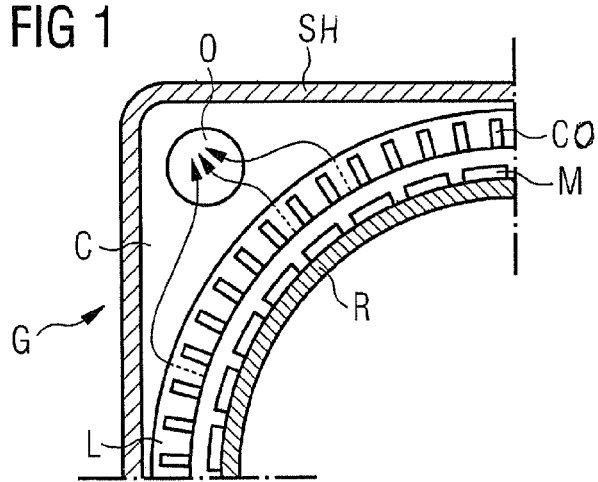
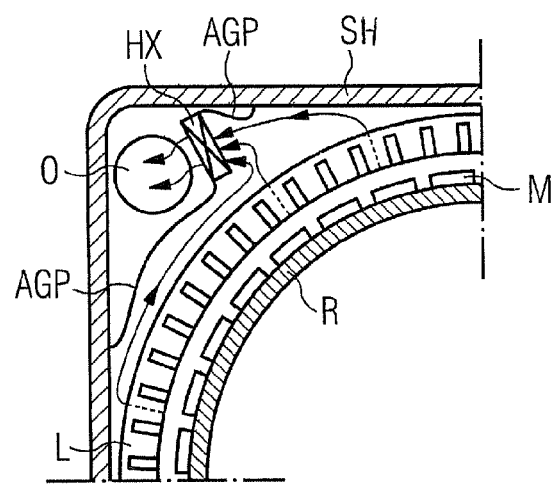
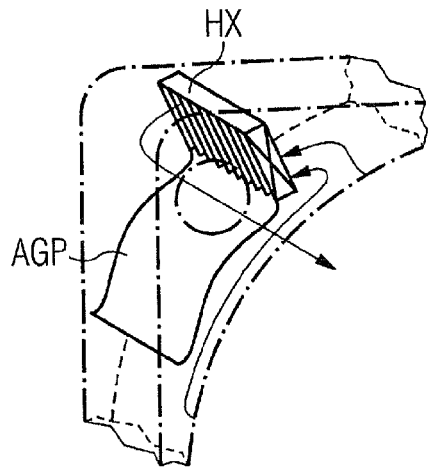
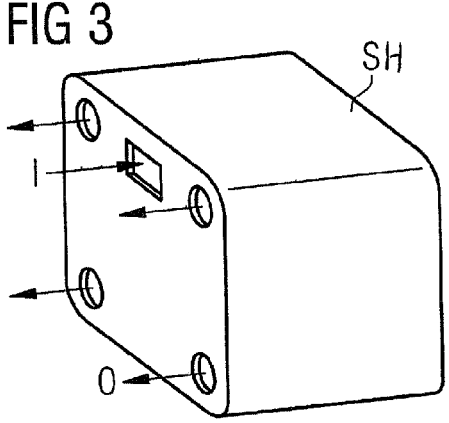

A-A

ARRANGEMENT FOR COOLING OF AN ELECTRICAL MACHINE

CROSS REFERENCE TO RELATED APPLICATIONS

This application claims priority of European Patent Office application No. 08018798.2 EP filed Oct. 28, 2008, which is incorporated by reference herein in its entirety.

FIELD OF INVENTION

The invention relates to a cooling-arrangement of an electrical machine.

BACKGROUND OF INVENTION

Electrical machines needs cooling to dissipate heat, which is generated during its operation by an ohmic resistance, by iron hysteresis, etc.

When a machine is installed indoor at a dry atmosphere it is possible to operate the machine without a housing, so a cooling is achieved by the circulation of ambient air through the machine.

But when the machine is installed under harsh conditions, like it is for generators being used in offshore wind-turbines, the electrical machine need to be totally enclosed, so ambient air is not allowed to circulate through the machine. For this application dedicated cooling-methods are required.

SUMMARY OF INVENTION

One very common cooling-method is the circulation of air or another gaseous medium inside the electrical machine. This air or other gaseous medium is kept cool with a heat exchanger. This cooling-method has the disadvantage that it requires large gas-to-air or gas-to-water heat-exchangers.

For example a generator, which is mounted within a nacelle of a wind-turbine, needs a huge air-cooling-system, to remove heat from the generator. This kind of air-cooling-system shows huge channels, which are used to suck away hot air from the generator and to pass the hot air on to an air-cooler.

These channels lead to big dimensions of the nacelle, too, which carries the generator and the air-cooler as well.

Because of the big dimensions heavy weight of the nacelle, transport-problems and problems with the mounting of huge parts near the planned location are caused.

FIG. 4, FIG. 5 and FIG. 6 show a cooling-system of a generator according to the state of the art.

In a preferred embodiment the generator is located inside a nacelle of a wind-turbine.

A typical generator G show a so called outer-stator S and a so called inner-rotor R with an air-gap AG between them.

The rotor R and the stator S are connected via a bearing B, which allows the rotor R to rotate around the stator S.

The rotor R carries a number of permanent-magnets M, while the stator S show a number of coil-windings CO, which are located into square-shaped slots of stacked laminate plates L.

The stacked laminate plates L are fixed and stabilized by two end-plates, as the laminate plates L are made of thin sheets of metal.

One or both of the end-plates show a number of square-shaped openings O, which are used for cooling-purposes as described below.

Air for cooling is guided through the generator G and is cooled down by help of a heat exchanger HX. The heat exchanger is located outside the generator G and can be developed as an air-to-air heat-exchanger or as an air-to-liquid heat-exchanger.

If the heat-exchanger HX is an air-to-liquid heat-exchanger a fan F is used to overcome pressure-losses in the cooling-circuit described below.

As the most part of the heat is produced within the coil-windings C and at winding-heads WH of the stator S, the air passes this part of the generator G through a number of air-slits AS.

As the most part of the heat is produced within the coil-windings CO and at winding-heads WH of the stator S, the air passes this part of the generator G through a number of air-slits AS.

From the manifold MA the air is guided to the heat-exchanger HX and is guided back via the fan F and the inlet opening I into the generator G.

As the hot air leaves the end-plate of the stator S through a number of openings O the manifold MA is needed to collect the hot air before it is sent to the heat exchanger HX. This manifold MA is complicated—in shape and in the used connection-technology, so the total length of the generator G and of the manifold MA is increased.

Therefore it is the aim of the invention to provide an improved cooling-arrangement with reduced dimensions for an electrical machine.

This aim is solved by the features of the independent claims. Preferred embodiments of the invention are subject of the dependent claims.

The inventive arrangement for cooling of an electrical machine comprises a rotor and a stator, while an air-gap is between the rotor and the stator. The rotor and the stator show arrangements to allow the circulation of air for cooling-purposes of the rotor and of the stator.

The rotor and the stator are encapsulated by an outer shell. The shell is formed to allow the flow of hot air from the rotor and the stator to a heat-exchanger and where the shell is formed to allow the flow of cool air from the heat-exchanger back to the rotor and the stator for cooling-purposes. The shell show a number of corners, while each corner is used to gather the hot air before it is guided to the heat-exchanger.

In a preferred embodiment the shell shows a square-shaped diameter so four corners are induced, which can be used to gather the air as described.

According to the invention an outer-part of the generator is square-shaped and is used as shell of the generator. The shell is developed as a plate in a preferred embodiment.

Therefore a number of corners are induced within the design of the housing/shell of the generator.

The square-shaped shell leads to the effect, that hot air leaving the generator is summed within the induced corners. The hot air can be sucked out directly from the corners and is guided without the need of huge channels (as described above) directly to the heat-exchanger. So the air-cooler as described above is reduced in length.

If the electrical machine is a generator, which is located inside a nacelle of a wind-turbine, it is possible to reduce the length of the nacelle, too.

If the length of the nacelle has to be kept constant, it is also possible to achieve additional working-place inside the nacelle to be used for another parts of the wind-turbine.

BRIEF DESCRIPTION OF THE DRAWINGS

The invention will be described in more detail by help of some figures, while:

FIG. 1 shows a part of the generator according to the invention,

FIG. 2 shows a preferred embodiment of the invention,

FIG. 3 shows a 3D-drawing of the invention, and

DETAILED DESCRIPTION OF INVENTION

FIG. 1 shows a part of the generator according to the invention in a principle drawing.

Figure 4:
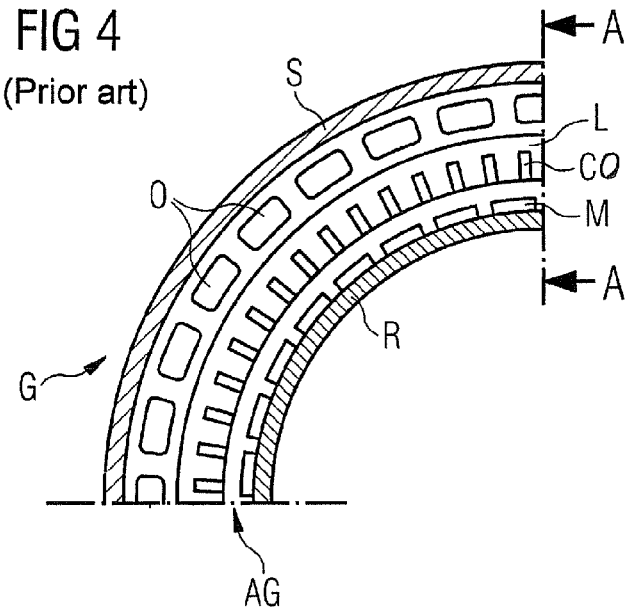
FIG. 4, FIG. 5 and FIG. 6 show a cooling-system of a generator according to the state of the art as described above into the introduction part of the invention.
Figure 5:
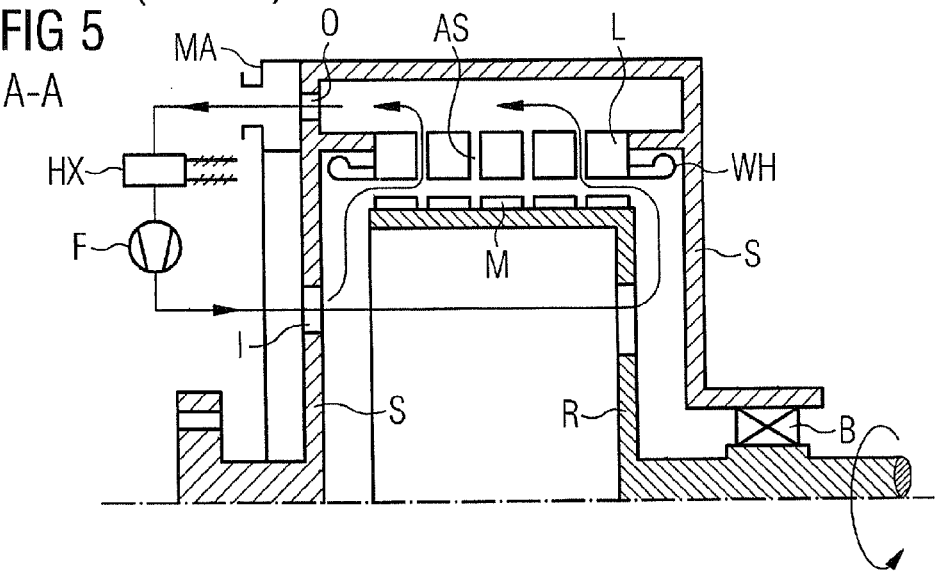
Figure 6:
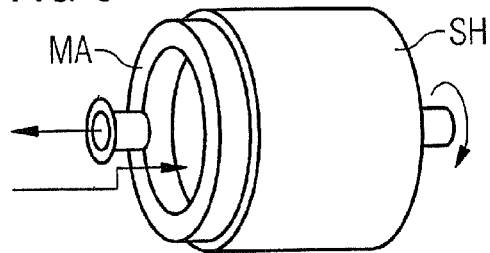

As described above in FIG. 4 the generator G show an inner-rotor R and a outer-stator (not shown in detail in FIG. 1).

The rotor R carries a number of magnets M, while the stator show coil-windings CO, which are carried by laminate-plates L.

An outer part of the generator G is square-shaped, so a square-shaped outer-shell SH of the generator is formed.

Because of this a number of corners C are induced within the shell-design of the generator G.

Hot air, which is circulating and leaving the generator G as described above in FIG. 4, is gathered and summed inside the corner C.

FIGS. 2a and 2b show a preferred embodiment of the invention.

A heat-exchanger HX is located inside the corner C, so the hot air passes through the exchanger HX, before it leaves the outer-shell SH via an opening O.

Because of the re-located heat-exchangers HX within the corners C more space is saved.

Two air-guide-plates AGP are used to guide the hot-air to the heat-exchanger HX.

As shown in figure FIG. 2b the heat-exchanger HX and the air-guides AGP can be extended over the whole length of the stator.

FIG. 3 shows a 3D-drawing of the invention.

Referring to FIG. 1 and FIG. 2 there is one opening O in each induced corner C of the outer-shell SH.

Because of the square-shaped outer-shell SH it is possible, that hot air is sucked out directly from the corners C to be guided (without the need of huge channels as described above) directly to an external heat-exchanger (not shown here).

The outer-shell SH shows one opening I, which is used to guide the cooling air back.

So the total length of the air-cooling-system and of the generator is reduced in length.

The invention claimed is:

1. An arrangement for cooling of an electrical machine, wherein the electrical machine comprises a rotor and a stator with an air-gap is arranged between the rotor and the stator, the rotor and the stator include a circulation arrangement to allow the circulation of air for cooling-purposes of the rotor and of the stator, and the rotor and the stator are encapsulated by a shell that is formed to allow the flow of hot air from the rotor and the stator to a heat-exchanger and the shell is formed to allow the flow of cool air from the heat-exchanger back to the rotor and the stator for cooling-purposes, and the shell includes a plurality of corners, each corner gathers the hot air before being guided to the heat-exchanger, the heat exchanger within at least one of the corners, the shell further comprising air-guide-plates located proximate the at least one of the corners to guide the hot air to the heat exchanger.

2. The arrangement according to claim 1, wherein the shell is square-shaped.

3. The arrangement according to claim 1, wherein the heat exchanger is located outside the shell.

4. The arrangement according to claim 1, wherein the heat-exchanger is located inside the corner.

5. The arrangement according to claim 1, wherein a dedicated corner of the shell is connected directly with the heat-exchanger such that the hot air is sucked out from the corner and is guided without channels directly to the heat-exchanger.

6. The arrangement according to claim 1, wherein air-guide-plates are located inside the corner to guide the hot-air to the heat-exchanger.

7. Arrangement according to claim 6, wherein the air-guide-plates are extended over the whole length of the stator.

8. The arrangement according to claim 1, wherein the stator comprises a plurality of laminate-plates, and the laminate-plates comprises a plurality of slots in which coils of the stator are arranged.

9. The arrangement according to claim 8, wherein the stator-coils exceed the slots of the laminate-plates to form winding-heads of the stator-coil.

10. The arrangement according to claim 9, wherein the circulation arrangement to allow the air-circulation is formed to circulate air through the air-gap and through the winding-heads of the stator-coil.

11. The arrangement according to claim 1, wherein the stator is arranged as outer stator, and the rotor is arranged as inner rotor of the electrical machine.

12. The arrangement according to claim 1, wherein the heat exchanger is an air-to-air heat-exchanger or is an air-to-liquid heat-exchanger.

13. The arrangement according to claim 12, wherein a fan is connected with the air-to-liquid heat-exchanger to overcome pressure-losses within the air-cooling-circuit.

14. The arrangement according to claim 1, wherein the electrical machine is a generator located inside a nacelle of a wind-turbine.

15. A generator, comprising:

a rotor;

a stator;

an air-gap is arranged between the rotor and the stator;

an arrangement to circulate air for cooling-purposes of the rotor and of the stator;

a heat-exchanger; and a shell that encapsulates the rotor and stator, the shell is formed to allow the flow of hot air from the rotor and the stator to the heat-exchanger and where the shell is formed to allow the flow of cool air from the heat-exchanger back to the rotor and the stator for cooling-purposes, the shell includes a plurality of corners, each corner gathers the hot air before being guided to the heat-exchanger, the heat exchanger within at least one of the corners, the shell further comprising air-guide-plates located proximate the at least one of the corners to guide the hot air to the heat exchanger.

16. An arrangement for cooling of an electrical machine comprising:

a rotor and a stator with an air-gap arranged between the rotor and the stator;

the rotor and the stator include a circulation arrangement to allow circulation of air for cooling of the rotor and of the stator;

the rotor and the stator are encapsulated by an outer shell formed to allow a flow of hot air from the rotor and the stator to a heat-exchanger and the outer shell is formed to allow a flow of cool air from the heat-exchanger back to the rotor and the stator for cooling; and the outer shell having a square-shaped cross-section comprising four corners, each corner gathering and summing the hot air before being guided to the heat-exchanger, the heat exchanger within at least one of the corners, the hot air sucked directly from the corners and guided without a need for channels to the heat exchanger before the hot air leaves the outer shell via an opening.

17. The arrangement according to claim 16, wherein a dedicated corner of the shell is connected directly with the heat-exchanger such that the hot air is sucked out from the corner and is guided without channels directly to the heat-exchanger.

18. The arrangement according to claim 16, wherein air-guide-plates are located inside the corner to guide the hot-air to the heat-exchanger.

19. The arrangement according to claim 18, wherein the air-guide-plates are extended over an entire length of the stator.

20. The arrangement according to claim 16, wherein
the stator comprises a plurality of laminate-plates, and
the laminate-plates comprise a plurality of slots carrying metal windings of coils of the stator.

21. The arrangement according to claim 20, wherein the stator-coils exceed the slots of the laminate-plates to form winding-heads of the stator coil.

22. The arrangement according to claim 21, wherein the circulation arrangement is formed to circulate air through the air-gap and through the winding-heads of the stator-coil.

23. The arrangement according to claim 20, wherein the stator is arranged as an outer stator, and the rotor is arranged as an inner rotor of the electrical machine.

24. The arrangement according to claim 23, wherein the stator-coils exceed the slots of the laminate-plates to form winding-heads of the stator-coil.

25. The arrangement according to claim 16, wherein the heat exchanger is an air-to-air heat-exchanger or is an air-to-liquid heat-exchanger.

26. The arrangement according to claim 25, wherein the heat exchanger is an air-to-liquid heat-exchanger and a fan is connected with the air-to-liquid heat-exchanger to overcome pressure-losses within an air-cooling-circuit.

27. The arrangement according to claim 16, wherein the electrical machine is a generator which is located inside a nacelle of a wind-turbine.

\* \* \* \* \*